May 12, 1953 W. D. MACGEORGE ET AL 2,638,035
ELECTRICALLY CONTROLLED TILTABLE REFLECTING MIRROR DEVICE
Filed Jan. 29, 1951 2 Sheets-Sheet 1
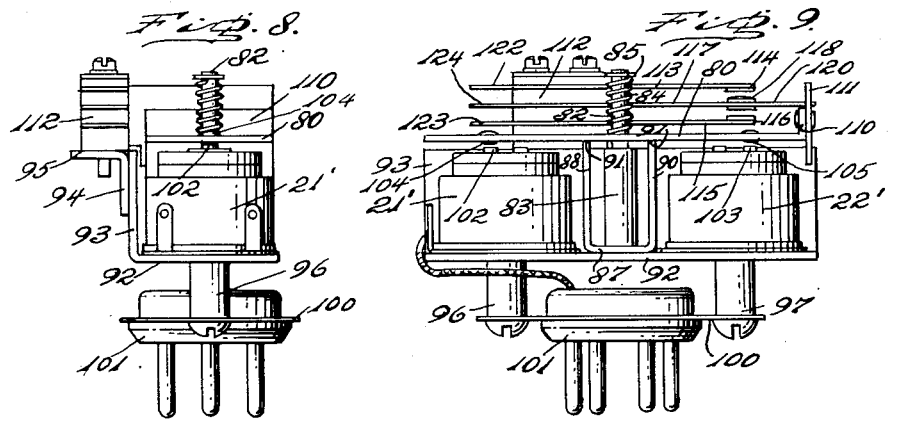
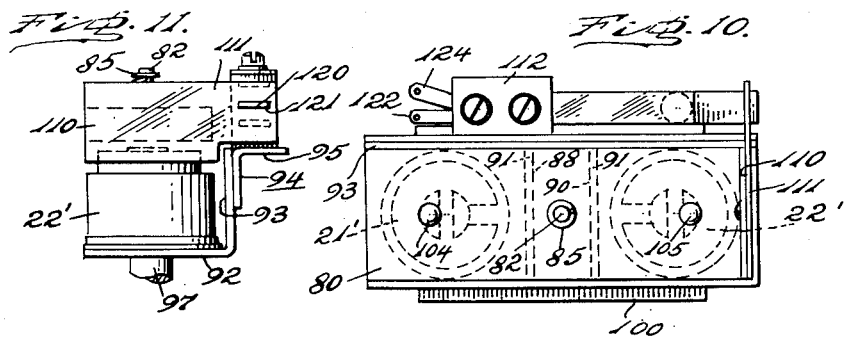
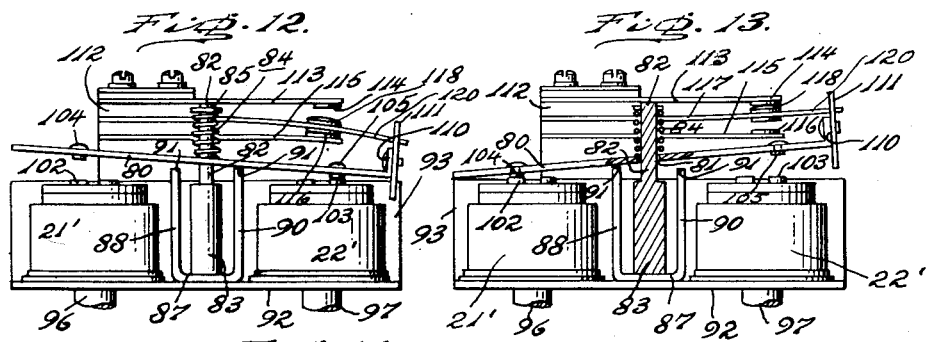
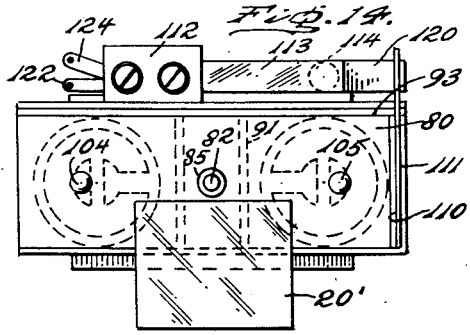
INVENTOR
William D. Macgeorge
Charles E. Roessler, Jr.
BY
Frank H. Borden
ATTORNEY May 12, 1953 W. D. MACGEORGE ET AL 2,638,035
ELECTRICALLY CONTROLLED TILTABLE REFLECTING MIRROR DEVICE
Filed Jan. 29, 1951 2 Sheets-Sheet 2
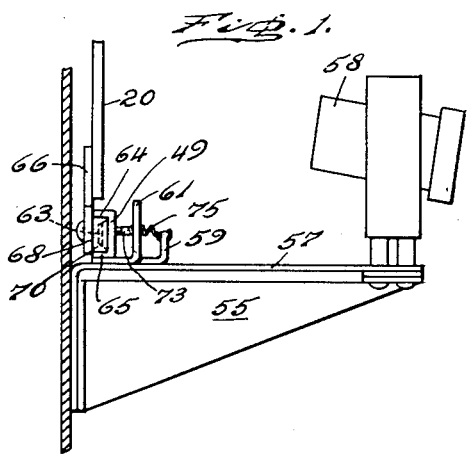
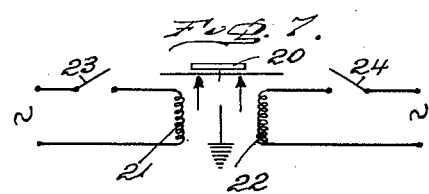
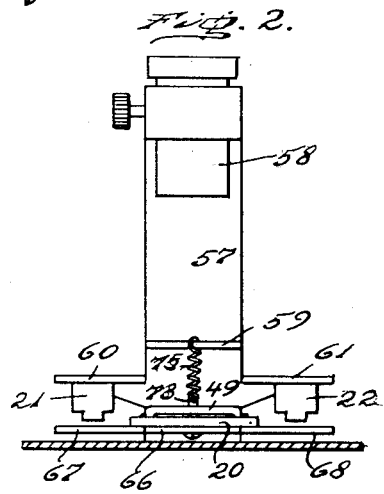
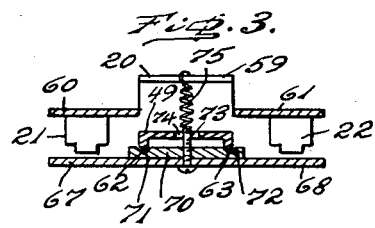
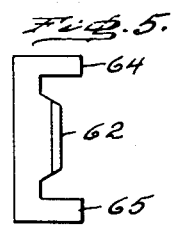
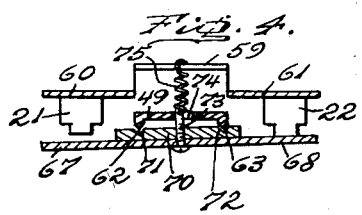
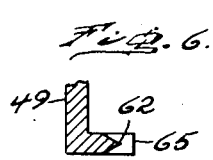
INVENTOR
William D. Macgeorge
Charles E. Roessler, Jr.
BY
Frank H. Borden
ATTORNEY Patented May 12, 1953

2,638,035

UNITED STATES PATENT OFFICE 2,638,035

ELECTRICALLY CONTROLLED TILTABLE REFLECTING MIRROR DEVICE

William D. Macgeorge, Collegeville, and Charles E. Roessler, Jr., Philadelphia, Pa., assignors to Automatic Temperature Control Co., Inc., Philadelphia, Pa., a corporation of Pennsylvania Application January 29, 1951, Serial No. 208,389

5 Claims. (Cl. 88—92)

This invention relates to electrically controlled tiltable devices for securing plural predetermined angular positionings of an element, and constitutes a continuation-in-part of application Serial Number 19,486, filed April 7, 1948, now Patent No. 2,599,005.

In said application there was disclosed a plural scale indicator by which an optical system was provided incorporating a reflector device susceptible to the assumption of a plurality of relatively different angular positions, with a rigid, stable, and non-vibratory support for the reflecting surface in each of the plurality of positions or attitudes, and which angular dispositions were controlled by a plurality of electromagnetic means in conjunction with a spring bias.

It is among the objects of this invention to provide an element with electro-magnetic controls by which the element is rigidly held in a plurality of different angular positions; to improve the art of optics; to improve the art of relays; to combine a reflector and a relay with means whereby simultaneously the reflector and relay occupy related coordinated positions, and by which simultaneously the angular position of the reflector can be changed with changes of the settings of the relay; to improve tilting devices; and to provide other objects and advantages as will become more apparent as the description proceeds.

In carrying out the invention in an illustrative form, a movable tilting element, which may comprise a reflector or a relay arm or both, or which may actuate any desired device, is mounted in a stable and instantaneously rigid position in one normal angular attitude on a primary support, such as spaced supporting elements having effective edges against which it is biased, and electro-magnetic means are provided by which selectively the tilting element can be swung on the primary support, to engagement with a selected one of two secondary supports spaced from the pivotal primary support to assume a new predetermined different and secondary angular attitude in stable instantaneously rigid support at such secondary attitudes, and wherein release from either secondary attitude is automatically followed by resumption of the normal attitude in stable support.

In the accompanying drawings:

Figs. 1 to 6 inclusive are taken from said patent application Ser. No. 19,486. In the drawings:

Fig. 1 represents a fragmentary side elevation of a portion of an optical system showing one form of the invention in side elevation with the electro-magnets removed for clarity.

Fig. 2 represents a top plan of the optical system portion of Fig. 1.

Fig. 3 represents a transverse section through the reflector assembly of Fig. 1, taken below the reflector itself, in one normal angular relation on its rigid support.

Fig. 4 represents a section similar to that of Fig. 3, through the reflector assembly in a second predetermined angular relation under the influence of an energized electro-magnet.

Figs. 5 and 6 represent details of the knife edge units of the reflector assembly, as disclosed in said patent application.

Fig. 7 represents a fragmentary wiring diagram of the circuits controlling the electromagnetic units of the tilting assembly of the invention.

Fig. 8 represents a side elevation of the invention applied to relays.

Fig. 9 represents a front elevation of the same, with the relay shown as a double throw, double pole relay with neither pole energized.

Fig. 10 represents a plan of the same.

Fig. 11 represents a side elevation of the same from the other side from Fig. 8.

Fig. 12 represents a front elevation of same with one pole of the double pole relay in contacting position coincident with attainment of one predetermined angular positioning or attitude of the movable element.

Fig. 13 represents the same with the other pole of the relay in contacting position coincident with attainment of another predetermined angular positioning or attitude of the movable element, shown partially in section to illustrate details.

Fig. 14 represents a plan of the relay device of Fig. 10 mounting a reflector for simultaneous relay and reflector actuation and control.

Referring to Figs. 1 to 7, a plural position, shown, illustratively, as a three position, tilting device, mounting a reflector or mirror 20 is provided, having a plurality of electro-magnets, illustratively two, respectively 21 and 22, each controlling one angular position of tilting device and thus of the mirror 20, the coils of which magnets are selectively energized by the switches 23 and 24 of Fig. 7, or by any other desired system. On a supporting frame 57, an optical projecting or focussing element 58 of the optical system is mounted to project the visual intelligence it is desired to reflect from the mirror 20. Frame 57 is reinforced by the flanged web 55 and supports the rigid compound bracket comprised of the forward lug 59 and the rearward, transversely extending, magnet supports 60 and 61, upon which the respective magnets 21 and 22 are rigidly supported. The bracket 59 and arms 60 and 61 are substantially integral with a multiple pivot stationary housing comprising a front plate 49 terminating laterally in the vertically extending horizontally spaced rearwardly directed knife edges, respectively 62 and 63, evenly spaced on each side of the median line of the reflector unit, and having upper and lower rearwardly extending parallel plates or lugs 64 and 65 respectively. This last unit forms a substantially or effectively square box, the upper and lower lugs or plates of which form vertical guide stops for the plate to be described, and the lateral edges of which form pivot lines for the said plate.

The mirror 20 is firmly mounted on a tiltable supporting assembly of a rear plate of generally inverted T formation having the upper mirror mounting portion 66 and the crosspiece forming lateral plates of magnetic material 67 and 68 juxtaposed to and affected by the respective electro-magnets when the latter are energized. On the front of the T-shaped plate a pivot plate 70 is firmly attached, having upper and lower parallel horizontal surfaces of such vertical spacing as to slide between the plates or lugs 64 and 65 to limit the relative vertical movements of the T plate in either direction, and provided with parallel vertical horizontally spaced notches 71 and 72. A pin 73 is anchored in the T plate and the pivot plate, and extends through the enlarged aperture 74 in the rocking or tiltable housing 49, and is connected resiliently by tension spring 75 to the fixed lug 59. It will be seen that energization of the electro-magnet 21 will pull the adjacent ear or plate portion 67 toward itself to a rigid stop, in this case part of the electro-magnet assembly, causing the T plate to rock about knife edge 62 in socket recess 71 as a pivot. This causes the recess 72 to pull away from its stationary knife edge 63 to effect an angular change of mirror position to a fixed stable secondary position in moving clockwise about the operative fixed pivot 62. This secondary stable position is on two spaced supports, one of which is edge 62 retained under the spring bias; the other of which are complemental portions of magnet 21 and arm 67. On the other hand, release of the electro-magnet 21 will release the T plate to permit the tilting frame and thus the mirror to swing counterclockwise about the pivot edge 62 until both knife edges are engaged by their respective notches, when the mirror will be held rigidly and stably in its mid-position under the bias of spring 75. From this latter position, as will be clear, and as shown in Fig. 4, energization of the electro-magnet 22 will cause attraction of the magnetic plate portion 68 to swing the mirror mounting assembly counter-clockwise about the knife edge 63, with positive stopped abutment against the magnet so that the mirror is rigidly and stably mounted at a cocked angle between two horizontally spaced stops. There will be an automatic subsequent clockwise movement of the mirror-mounting assembly upon de-energization of the electro-magnet 22 to rigidly and stably support the mirror in a normal attitude on two horizontally spaced stops against which it is held by the tension spring 75. The accuracy and stability and freedom from response to vibrations attained by the utilization of the spaced pivots and the rest of the rocking assembly will be evident.

In the form of the invention of the Figs. 8 to 14 inclusive, the same principles are involved, although certain of the parts are reversed for reduced costs and efficiency. In the preferred embodiment of the relay, the same three positions of a movable or tiltable member 80 are contemplated as with the reflector, although here, as with the reflector type, it will be understood that by suitable multiples of plates, spaced supporting members and additional electro-magnetic means, five or even seven positions of the controlling ultimately tiltable member can be effected. The relay of these figures is typical of a device or mechanism actuated or controlled by the basic three position tiltable element.

Member 80, which is generally horizontally disposed, has a central aperture 81 loosely engaging the reduced shank 82 of the vertical stud 83, and is biased axially of the shank by the compression spring 84 engaged between the upper surface of member 80 and an anchoring collar 85 on shank 82. The stud 83 is mounted rigidly upon the connecting strip 87 of a U-shaped piece, having the vertically upstanding generally parallel spaced legs 88 and 90 spaced evenly on both sides of the stud. The upper terminal edges 91—91 of legs 88 and 90 may be relatively angular as shown or may be tapered toward knife edges, if desired. Obviously, they may comprise spaced engaging points in alignment; hence, these and those of the earlier figures are referred to hereinafter as "effective" edges. The member 80 is forced by the bias of the spring, to engage both effective terminal edges 91—91 of the respective legs, upon a rigid and stable support, formed thereby, to maintain the member 80 in a normal horizontal disposition comprising its attitude in space. The U-shaped member and stud 83 are rigidly mounted on a frame member 92 having the lateral upstanding flange 93. A relatively short angle element 94 is mounted on the flange 93, having a horizontal portion 95 to mount the contact assembly of the relay or any other mechanism to be actuated or controlled by the tiltable element 80. Preferably, the frame 92 is mounted on vertical studs 96 and 97 extending from the lower surface which engage a plate 100 mounting a plug-in device 101 for mounting the relay assembly in a plug-in socket device carrying the relay leads. Plug-in device 101 has male prong elements electrically connected to the relay contact members, if desired, as well as those leading to the respective electro-magnets to be described. Alternatively, the control circuit leads may have direct connections with the relay elements.

Mounted on the upper surface of the frame 92 are the two vertically extending parallel spaced electro-magnets 21' and 22', disposed beneath the member 80 on opposite sides of the U piece, spaced from the respective legs thereof. Preferably the upper ends of the electro-magnets 21' and 22' have upper stop members respectively 102 and 103, in registration respectively with abutment plugs or the like 104 and 105 on tiltable element 80. It will be seen that from the neutral or normal horizontal position of Fig. 9, actuation or energization of electro-magnet 22' will exert a pull on the contiguous portion of member 80, to snap it out of its symmetrical seating on both effective leg edges 91, into rigid stable mounting on the edge 91 of leg 90 for one support, and with the abutment member 105 rigidly engaging stop 103 for the complemental support, in stably and rigidly holding the member in a secondary inclined position or attitude, shown in Fig. 12, aided by the bias of spring 84. Opening of the circuit through electro-magnet 22' will release its attraction on member 80, which will then move sharply into its symmetrical horizontal disposition of Fig. 9 under the influence of the bias of spring 84. On the other hand, from this latter position, it will be clear that energization of magnet 21' will snap the member 80 into another secondary inclined position in a stable two point support, one of which comprises effective edge 91 of leg 88 and the other of which is comprised of abutment means 104 and 102. In either case of the secondary inclined attitude the turning of member 80 is about an edge 91, and the clearance of aperture 81 on shank 82 is proper to permit this. In this connection it will also be understood that the nature and diameter of spring 84 is such as to impose restoring bias on member 80 operative when the magnetic flux is interrupted to restore the member to its horizontal position.

The member 80 at one end carries an upstanding flange 110, to which a contact-controlling or like mechanism actuating plate 111 is secured, extending transversely beyond the member 80. An insulating block 112 is mounted on the supporting surface 95 toward one end of the assembly and may comprise insulating laminations, and three resilient contact arms are insulatedly mounted therein. These comprise an upper arm 113, the free outer end of which mounts a downwardly presenting contact 114, a lower resilient arm 115, the free outer end of which mounts the upwardly presenting contact 116, and the median elongated resilient arm 117, the free end of which has a double contact 118 in such position as selectively to engage and make contact with either contact 114 or 116. In the normal unstressed condition of arm 117, all contacts are disengaged. The median arm 117 is extended longitudinally beyond the double contact 118 into a terminal end 120 fitted into a horizontal slot 121 in the overhanging lateral extension of the plate 111. As shown in Figs. 9, 10 and 14, soldering terminals 122, 123 and 124 are mounted in electrical contact with the arms 113, 115 and 117 respectively. These are removed from the other figures for clarity. These terminals are wired to the circuits controlled by the relay, of which the intermediate terminal is common to both circuits.

It will be seen, as shown in Fig. 9, that with no currents in either electro-magnet and the member 80 in a horizontal position, the median contact arm is unflexed and makes contact with neither contact 114 or 116, whereas movement of member 80 to either inclined position flexes the end 120 of extended resilient arm 117 so as to engage either contact 114 or 116 with double contact 118, depending upon the sense of the flexing. For compound use the device of Fig. 14 both oscillates the reflector 20' and also controls the circuits through the relay in a related sense.

It will be clear that many changes and modifications can be made in the invention without departing from the spirit of the invention. Thus, the spaced effective edges need not be on spaced legs, they may, under proper circumstances, be the side edges of a solid block. Similarly, the secondary support means need not be mounted on or a part of the electro-magnets, and they may be mounted on either side of the magnets with reference to the primary support. Finally, it will be understood that although two electro-magnets are preferred, mounted substantially as disclosed, it will be understood that they may be differently disposed and they may comprise a single unit. For instance, it will be seen that if the energizing source for either magnet shown is D. C., which is contemplated as well as the A. C. indicated, mere reversal of the polarity of either energizing magnet will alternately attract or repel the contiguous magnetic portion of the tiltable frame, so that a single magnetic means may be used to secure the three attitude control of the tiltable element.

Having thus described our invention, we claim:

1. In optical systems, a primary support, two secondary supports, a tilting device mounted on the primary support, light reflective means mounted rigidly on the device for exposure to a projected light beam having a substantially fixed average median line of projection means biasing the tilting device toward said primary support to effect stable support of said tilting device and light reflective means in two mutually normal dimensions of the latter on the primary support out of contact with the secondary supports, in one attitude in space relative to such beam, whereby a primary reflection of such beam has an average median line fixed in space, electro-magnetic means cooperating with the tilting device and with the biasing means to effect two alternative secondary stable supports of the tilting device on the primary support stable in the same said two mutually normal dimensions of the light reflective means and the alternatively selected secondary supports, in two respective predetermined attitudes in space angularly divergent from each other and from the said one attitude, whereby each secondary reflection of such beam has an average median line fixed in space and each lies in a plane common with the average median line of said primary reflection and the other secondary reflection.

2. In optical systems in combination, means for projecting a light beam having an average median line of projection substantially fixed in space, a support and tiltable means in juxtaposition and each comprising to the other a complemental element, light reflective means rigidly mounted on one element and disposed in the path of said light beam first and second support means comprising spaced effective edges on one element and surfaces respectively complementary thereto on the other element, means biasing one element toward the other to effect a normal stable support of one element on the other and thus a fixed relation of the reflective means to said projected beam with both effective edges engaging their respective complemental surfaces, said beam having an angle of incidence against said light reflective means inclined to the perpendicular in said normal stable support condition and establishing a primary reflection having an average median line, first and second auxiliary support means each comprising complemental portions mounted on the respective elements spaced from and respectively on opposite sides of said edges in the line of spacing thereof, said portions of each auxiliary support means being spaced apart during said normal stable support, a first and a second electro-magnet mounted respectively on one element adjacent to a respective auxiliary support means and in operative juxtaposition to the other element so that when respectively energized one element turns about one effective edge and closes the space between the portions of the auxiliary support means adjacent thereto to establish a secondary stable support on said one element on said one effective edge and said auxiliary support means at which the angular relation of said reflective means is predeterminedly changed relative to said beam in one direction only to establish a secondary reflection of said beam having an average median line angularly displaced from that of the primary reflection while lying in a common plane containing the median line of the primary reflection.

3. In reflectors, a relatively fixed support, plate means having a reflecting surface, two first sets of complemental supporting elements disposed between the fixed support and said plate, said sets being spaced in one dimension of the plate means, a secondary supporting element disposed between the plate means and the fixed support and incorporating a lost motion space, means biasing the plate toward the two first sets of supporting elements to establish a predetermined angular relation of the plate to the fixed support, and means operative to tilt the plate about one of the first sets of complemental members as a pivot while maintaining same as one plate means support and to absorb the lost motion space of the secondary supporting element to furnish a second support between the plate and the fixed support at which the said predetermined angle of the plate is shifted to a second predetermined angle thereof relative to said fixed support.

4. In reflectors, a relatively fixed support, a plate having a reflecting surface, a first set of complemental contact means disposed between the plate and the support, a second set of complemental contact means spaced from the first set in a dimension of the plate, means biasing the plate toward the support to normally cause engagement of both sets of complemental contact means to establish a given angular relation of the plate relative to the support, a pair of electro-magnetic means disposed between the plate and the support outwardly respectively spaced from the first and second sets of complemental contacts and each incorporating a space between the plate and support, said electromagnetic means being respectively operable upon energization to move the plate about the adjacent set of complemental contact means as a pivot to simultaneously separate the other set of complemental contacts and close said space to furnish a secondary support for the plate at which the given angular relation to the fixed support is predeterminedly changed.

5. In reflectors, a relatively fixed support, a plate having wings and bearing a reflecting surface, a first and a second set of complemental separable supporting elements disposed respectively on the fixed support and said plate having such appreciable extent transversely of the wings and being spaced in the extent of the wings so as to form a rigid support for the plate when both sets are engaged, means operative between the plate and support in the space between the respective sets as to urge the plate toward the support and to engage both sets of the separable supporting elements to establish a rigid support for the plate with a given angular relation to the support, a first and a second electro-magnetic device disposed respectively between the wings and the fixed support and normally incorporating a lost motion space, said electro-magnetic means being selectively operable to pull the selected wing toward the support to turn the plate about the adjacent set of supporting elements to simultaneously separate the other said set and close said instant incorporated space to establish a rigid support for the plate between the selected wing and the support at a different angle for the plate relative to the support.

WILLIAM D. MACGEORGE.
CHARLES E. ROESSLER, Jr.

References Cited in the file of this patent

UNITED STATES PATENTS

| Number | Name | Date |
|---|---|---|
| 314,771 | Abbot | Mar. 31, 1885 |
| 1,694,833 | Shively | Dec. 11, 1928 |
| 1,700,511 | Page | Jan. 29, 1929 |
| 1,736,683 | Wakeland | Nov. 19, 1929 |
| 2,060,351 | Simjian | Nov. 10, 1936 |
| 2,419,999 | Leck | May 6, 1947 |
| 2,436,224 | Ogle | Feb. 17, 1948 |
| 2,448,772 | Clare et al. | Sept. 7, 1948 |